US010731684B2

(12) United States Patent
Ruszkiewicz et al.

(10) Patent No.: US 10,731,684 B2
(45) Date of Patent: Aug. 4, 2020

(54) ELECTRICALLY ASSISTED FLOW DRILL SCREWDRIVING AND FIXTURE THEREFORE

(71) Applicant: Clemson University, Clemson, SC (US)

(72) Inventors: Brandt J. Ruszkiewicz, Greenville, SC (US); Jamie D. Skovron, Greenville, SC (US); Laine Mears, Anderson, SC (US)

(73) Assignee: Clemson University Research Foundation, Clemson, SC (US)

( * ) Notice: Subject to any disclaimer, the term of this patent is extended or adjusted under 35 U.S.C. 154(b) by 45 days.

(21) Appl. No.: 15/898,805

(22) Filed: Feb. 19, 2018

(65) Prior Publication Data

US 2018/0238362 A1 Aug. 23, 2018

Related U.S. Application Data

(60) Provisional application No. 62/460,462, filed on Feb. 17, 2017.

(51) Int. Cl.
*F16B 5/02* (2006.01)
*B25B 23/14* (2006.01)
*B25B 23/147* (2006.01)
*B21J 5/06* (2006.01)
*F16B 25/10* (2006.01)
*F16B 25/00* (2006.01)

(52) U.S. Cl.
CPC ............ *F16B 5/02* (2013.01); *B21J 5/066* (2013.01); *B25B 23/1405* (2013.01); *B25B 23/147* (2013.01); *F16B 25/0021* (2013.01); *F16B 25/106* (2013.01)

(58) Field of Classification Search
CPC combination set(s) only.
See application file for complete search history.

(56) References Cited

U.S. PATENT DOCUMENTS

2019/0134738 A1* 5/2019 Spinella ............. B23K 11/3009

OTHER PUBLICATIONS

Miller, S.F., Wang, H., and Shih, A.J., 2006, "Experimental and Numerical Analysis of the Friction Drilling Process," Journal of Manufacturing Science and Engineering, 128 p. 802-810.
Miller, S.F., Tao, J., and Shih, A.J., 2005, "Friction drilling of cast metals," International Journal of Machine Tools and Manufacture, 46(12-13) p. 1526-1535.
Miller, S.F., Blau, P.J., and Shih, A.J., 2005, "Microstructural alterations associated with friction drilling of steel, aluminum, and titanium," Journal of Materials Engineering and Performance, 14(5) p. 647-653.

(Continued)

*Primary Examiner* — John C Hong
(74) *Attorney, Agent, or Firm* — Dority & Manning P.A.

(57) ABSTRACT

Electrically assisted flow drill screwdriving processes (EAFDS) and devices are described. The methods can augment traditional FDS and allow for softening of metals of a stack-up, which can enable FDS joining of thicker and stronger materials such as boron steel. EAFDS methods can reduce cycle time and can be used to join thicker cross-sections with reduced installation torque. Also disclosed are fixtures for attachment to existing devices that can provide for the electrical augmentation of existing FDS processes.

12 Claims, 6 Drawing Sheets

(56) References Cited

OTHER PUBLICATIONS

Miller, S.F. and Shih, A.J., 2007, "Thermo-mechanical finite element modeling of the friction drilling process," Journal of Manufacturing Science and Engineering, 129 p. 1-8.
Miller, S.F., Blau, P.J., and Shih, A.J., 2007, "Tool wear in friction drilling," International Journal of Machine Tools and Manufacture, 47 p. 1636-1645.
Skovron, J., Mears, L., Ulutan, D., Detwiler, D. et al., 2015, "Characterization of Flow Drill Screwdriving Process Parameters on Joint Quality," SAE International Journal of Materials and Manufacturing 8(1):p. 35-44.
Skovron J.D., Prasad R.R., Ulutan D., et al., 2015, "Effect of Thermal Assistance on the Joint Quality of Al6063-T5A During Flow Drill Screwdriving," ASME Journal of Manufacturing Science and Engineering 2015;137(5).
Machlin, E.S., 1959, "Applied voltage and the plastic properties of "brittle" rock salt," J Appl Phys30 (7) p. 1109-1110.
Okazaki, K., M. Kagawa, and H. Conrad, 1980,"An evaluation of the contributions of skin, pinch and heating effects to the electroplastic effect in titanium," Materials Science and Engineering45, No. 2 p. 109-116.
Conrad, H., Sprecher, A. F. Cao, W. D. and Lu, X. P., 1990, "Electroplasticity—the Effect of Electricity on the Mechanical Properties of Metals." Jom42.9 p. 28-33.
Long, X., and Khanna, S.K., 2005, "Modelling of electrically enhanced friction stir welding process using finite element method," Science and Technology of Welding & Joining10, No. 4 p. 482-487.
Ferrando, W.A., 2008, The concept of Electrically Assisted Friction Stir Welding (EAFSW) and application to the processing of various metals. No. NSWCCD-61-TR-2008/13. Naval surface warfare center carderock div bethesda and survivability structures and materials directorate.
Pitschman, M., Dolecki ,J.W., Johns, G.W., Zhou, J., and Roth, J.T,, 2010,"Application of electric current in friction stir welding," ASME 2010 International Manufacturing Science and Engineering Conference, p. 185-189.6 Copyright © 2016 by ASME.
Potluri, H., Jones, J.J., and Mears, L., 2013,"Comparison of electrically-assisted and conventional friction stir welding processes by feed force and torque," ASME 2013 International.Manufacturing Science and Engineering Conference collocated with the 41st North American Manufacturing Research Conference, pp. V001T01A055-V001T01A055.
Santos, T.G., Miranda, R.M.,, and Vilaça, P., 2014,"Friction Stir Welding assisted by electrical Joule effect," Journal of Materials Processing Technology214, No. 10p. 2127-2133.
Luo, J., Li, F., and Chen, W., 2013, "Experimental researches on resistance heat aided friction stir welding of Mg alloy," 焊接学会論文集 31, No. 4 p. 65s-68s.
Luo, J., Chen, W., and Fu, G., 2014, "Hybrid-heat effects on electrical-current aided friction stir welding of steel, and Al and Mg alloys," Journal of Materials Processing Technology 214, No. 12 p. 3002-3012.
Liu, X., Lan, S., and Ni, J., 2015, "Electrically assisted friction stir welding for joining Al 6061 to TRIP 780 steel," Journal of Materials Processing Technology 219 p. 112-123.
Salandro, W. A., Jones, J. J., Bunget, C., Mears, L., & Roth, J. T., 2015, "Introduction to Electrically Assisted Forming," Electrically Assisted Forming, p. 23-36, Springer International Publishing.
Troitskii, O. A., 1969, "Electromechanical Effect in Metals," Zh. Eksp. Teor. Fiz. 10, p. 18-22.
FDS®. EJOT GmbH, n.d. Web. Feb. 15, 2016. <http://www.ejot.com>.

\* cited by examiner

ELECTRICALLY ASSISTED FLOW DRILL SCREWDRIVING AND FIXTURE THEREFORE

CROSS REFERENCE TO RELATED APPLICATION

This application claims filing benefit of U.S. Provisional Patent Application Ser. No. 62/460,462 having a filing date of Feb. 17, 2017, entitled "Electrically Assisted Flow Drill Screwing Process (FDS) and Fixturing," which is incorporated herein by reference for all purposes.

BACKGROUND

Increasing fuel economy standards have motivated automakers to reduce vehicle mass with multi-material bodies-in-white. One joining technology particularly well suited for one-sided multi-material joining is Flow Drill Screwdriving (FDS), a process that joins two materials together by friction drilling a pilot hole and then forming threads and tightening the fastener to a given torque, all using a self-tapping screw fastener that passes through the stack-up workpiece. This results in a mechanical threaded joint and allows for dissimilar lightweight materials to be incorporated in the joined structures, which can provide cost benefits in both formation and use. For instance, in the specific application of transportation, the ability to quickly and safely join two dissimilar lightweight materials can reduce vehicle costs as well as fuel consumption.

As illustrated in FIG. 1, the FDS process is a dry process that includes six steps classified as: heating (1), penetration (2), extrusion forming (3), thread forming (4), screwdriving (5), and final torqueing (6). FDS induces thermal softening of the stack-up materials through frictional heating by use of a conical-tipped fastener that forms an elongated region of the stack-up materials and allows for threading of the materials (FIG. 2). FDS requires time for the heat to build, having a process time of 1-2 seconds (exclusive of the fastener driving element finding process), with the torque to thread-form workpiece materials limited to 8.3 N-m for M5 fasteners and 12 N-m for heavier M6 fasteners (FIG. 3). Beneficially, by use of FDS, the fastener is removable (which is ideal for repairability), and the same fastener/machine combination can be used regardless of material type or thickness, only requiring a change in parameters for different material characteristics. FDS has thus become the leading alternative to self-piercing riveting (SPR) when the joining back side is not accessible.

While FDS has become the leader in one-sided multi-material joining, issues still exist. For instance, stack-ups are generally limited to a thickness of about 7 mm, and materials in transportation applications (among others) are transitioning from thin steel sheets to aluminum extrusions as thick as 5 mm. In addition, one-sided joining of higher strength steels is not possible, with FDS being limited to low strength steel or aluminum. FDS is also a slow process compared with other joining technologies (e.g. resistance spot welding, Rivtac, friction element welding, SPR), with 50% of total process time coming from the first three forming steps (heating, penetrating, extrusion forming).

A significant process variable of FDS is the axial force, $F_{axial}$, applied to the fastener to penetrate the workpiece. As the axial force increases, process time decreases, which is sought after but not at the expense of an increased installation torque or base material deformation. A lowered axial force allows for a higher heat generation due to the extended contact time between the tool and the workpiece, but this increases process time. A higher axial load decreases process time resulting in lower part temperature and a higher installation torque. Installation torque is limited by the torsional strength of the fastener. For instance, the installation torque limit on FDS fasteners is 8.3 N-m (M5) and 12 N-m (M6) due to the standardized values of self-tapping screws.

Attempts have been made to improve FDS processing techniques. For instance, the effect of thermal assistance on the FDS process has been examined using a preheating conduction ring. Samples were preheated to various temperatures and a 20% reduction in installation torque and 52% reduction in process time were observed on those samples preheated to 247° C. Unfortunately, using a conduction ring to pre-heat requires an extended time for the material to reach the desired temperature.

What is needed in the art is FDS with improved processing. For instance, methods and devices that can raise the temperature of the materials prior to and/or during joining could be beneficial by providing decreased installation torque and decreased processing time, which could also provide for FDS joining of thicker workpieces.

SUMMARY

According to one embodiment, disclosed is an FDS fixture that includes a first electrical lead configured to contact a first side of a stack-up workpiece and a second electrical lead configured to contact a second, opposite side of the stack-up workpiece. In addition, the device can include a power supply in electrical communication with the first and second electrical leads. Significantly, the device is configured such that the electrical leads are electrically isolated from other components of an FDS joining machine, e.g., from a motor, for instance by use of a non-conductive FDS driving element or driving element extension, and/or a non-conductive FDS downholder, or the like.

According to another embodiment, disclosed is an FDS method for joining a first metal piece to a second metal piece. A method can include placing a first side of a stack-up workpiece in electrical contact with a first electrical lead and placing a second, opposite side of the stack-up workpiece in electrical contact with a second electrical lead, the stack-up workpiece including the first and second metal pieces. The method also includes establishing an electrical current density between the first lead and the second lead and across the stack-up workpiece. In addition, a method can include rotating an FDS fastener while imparting an axial force on the fastener by which a portion of the FDS fastener passes through the stack-up workpiece and the first and second metal pieces are joined to one another.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
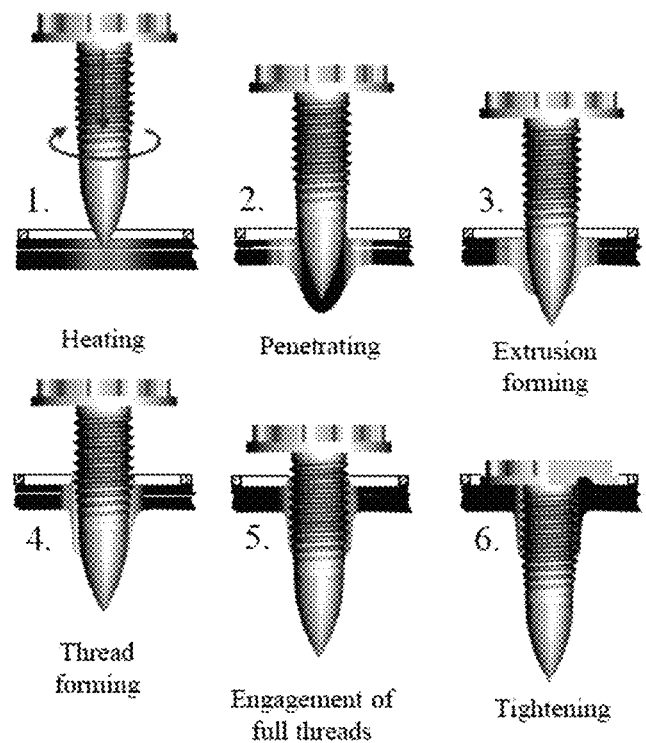
FIG. 1 schematically illustrates the six steps of an FDS fastening technique.
Figure 2:
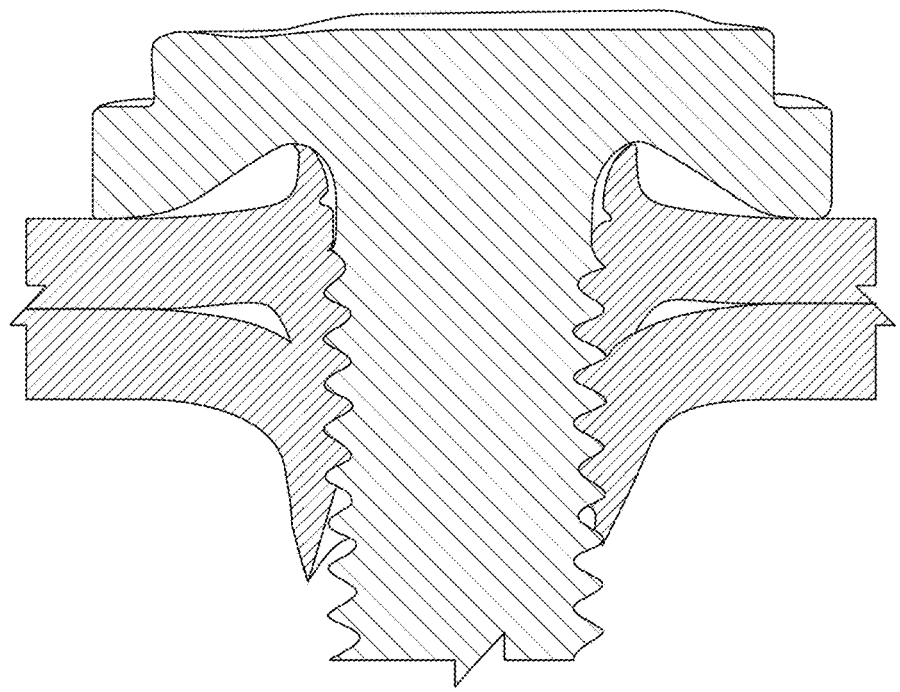
FIG. 2 illustrates an FDS joint.
Figure 3:
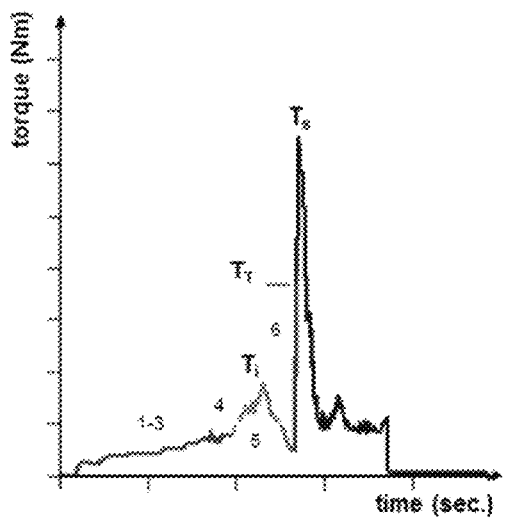
FIG. 3 graphically presents the change in torque with time for an FDS fastening technique.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are electrically assisted flow drill screwdriving processes (EAFDS) and fixtures for use in the disclosed processes. Beneficially, fixtures and methods described herein can allow for electricity to be passed through a target part without damaging the FDS machine.

Electrically assisted manufacturing (EAM) in other applications has been demonstrated to be capable of lowering a metal's yield point while simultaneously increasing the material's ductility. This effect is known as the electroplastic effect and, while not fully understood, is most commonly believed to be caused by localized resistive heating at the atomic level. This heating occurs around impurities, dislocations, grain boundaries and other locations of lattice distortion. However, alternative theories have also been postulated and include: 1) dislocation motion assistance by flowing electrons known as the electron wind; and 2) the softening of the metallic bond due to the addition of excess electrons to the microstructure of the metal. However, while the cause of the EAM behavior has not been fully established, the effects have been examined and proven to be repeatable and controllable. Thus, the lack of a definitive theoretical basis has not limited the adaption of the technology within industry.

The EAFDS process disclosed herein can augment the traditional FDS process to allow for softening of metals of a stack-up and enable FDS of thicker and stronger materials such as boron steel (e.g., Usibor 1500) which has a tensile strength of 1500 MPa, and is currently one of the strongest steels available. For instance, disclosed methods can be used to join metal pieces in which one or both of the pieces is a hard steel, e.g., having a tensile strength of about 1000 MPa or greater. In addition, EAFDS can to reduce cycle time, as electricity can heat metals quickly due to resistive heating, and can be used to join thicker cross-sections, e.g., greater than about 7 mm in some embodiments, with reduced installation torque.

Figure 4:
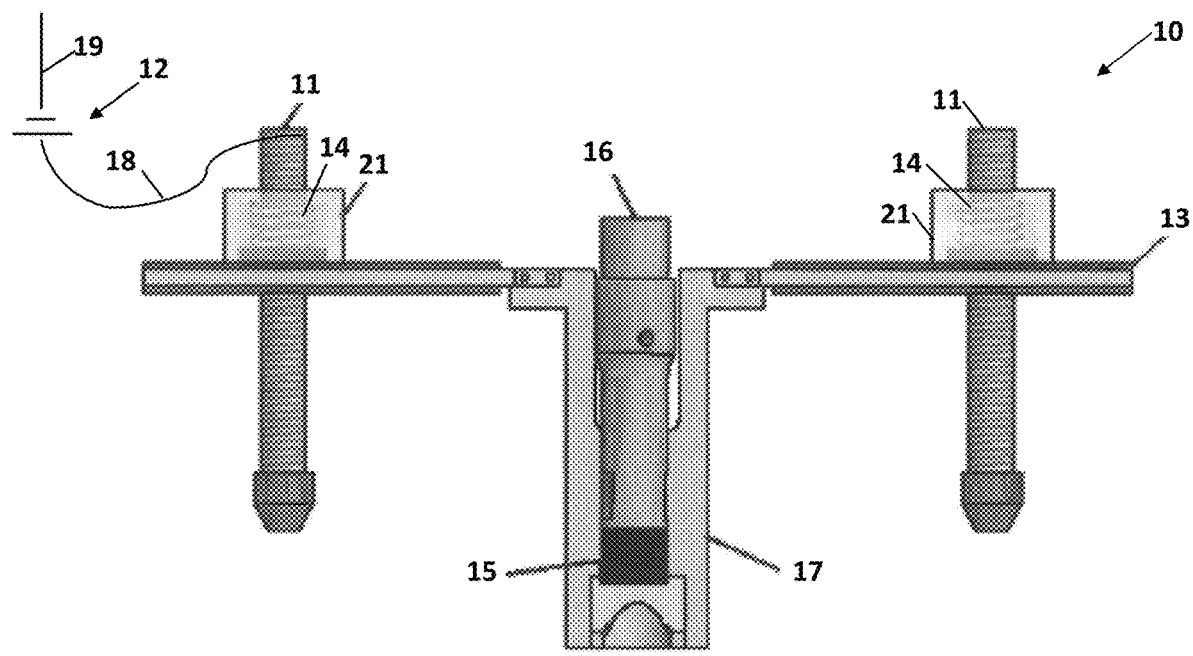
FIG. 4 schematically illustrates a front view of an FDS fixture as may be utilized in a process as disclosed herein.
Figure 5:
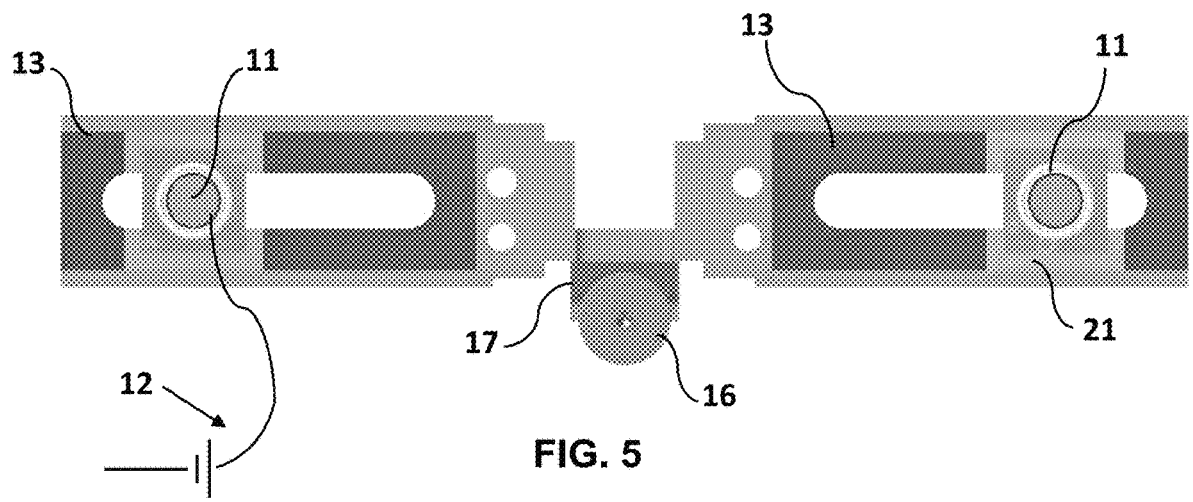
FIG. 5 schematically illustrates a top view of the FDS fixture illustrated in FIG. 4.
Figure 6:
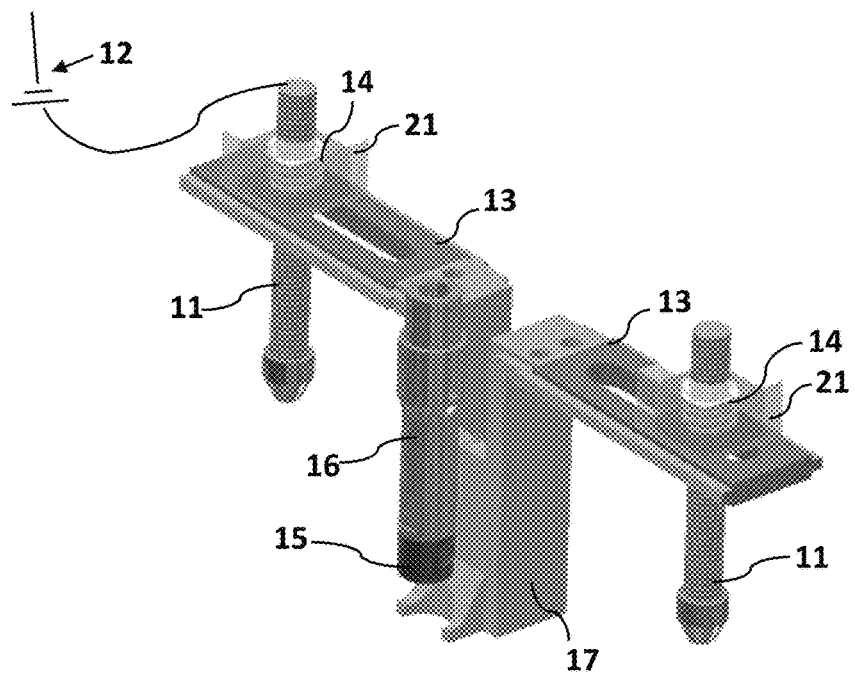
FIG. 6 schematically illustrates a perspective view of the FDS fixture illustrated in FIG. 4.

FIG. 4, FIG. 5 and FIG. 6 schematically illustrate one embodiment of an EAFDS fixture 10 as may be utilized to provide for electrical assistance in an FDS process as described herein. The fixture 10 can be utilized in conjunction with a typical flow drill screw device (e.g., a Weber RSF, a DEPRAG FFS, or a Klingel K-Flow device as are known in the art), and can allow for application of electric current to a work piece during an otherwise typical FDS process.

A fixture 10 can be attached to an existing FDS machine (e.g., as an upgrade) or can be a component of an FDS machine upon initial formation. For instance, a fixture 10 can be attached to an FDS machine via a downholder 17, which is a standard component of most FDS machines. A downholder 17 functions as a pressure foot to resist movement of the upper piece of a stack-up during joining. In those embodiments in which an FDS machine does not include a downholder 17, a fixture 10 can alternatively be attached to an existing FDS machine by another suitable component, for instance via a platen that holds a work piece (not shown).

A fixture 10 can include a connecting plate 13, that is configured to provide electrical communication between an electrical lead assembly 12 and a work piece as well as to attach the fixture 10 to the remainder of the FDS machine. In order that the electrical lead assembly 12 and the workpiece are electrically isolated from the rest of the FDS machine (the motor, handles, etc.), a fixture 10 can include non-conductive materials that provide the necessary electrical isolation. For instance, a fixture 10 can include a non-conductive driving element extension 16 that engages a fastener and maintains electrical isolation between the driving element 15 and a fastener during use. In other embodiments, for instance when considering formation of an FDS machine, rather than an upgrade of an existing device, the driving element 15 itself may simply be formed of a non-conductive material, without the need for a non-conductive driving element extension 16.

Similarly, the downholder 17 to which the connecting plate 13 is attached can be formed of a non-conductive material.

Suitable non-conductive materials for electrical isolation can include those able to withstand the working environment of the FDS machine including, without limitation, ceramics, glass reinforced composites, high performance polymers, etc.

The fixture 10 also includes one or more connectors 11, for instance in the shape of extended rods that can provide for electrical communication between the electrical lead assembly 12 and a workpiece. For instance, a first lead 18 can be in electrical communication with a connector 11 that contacts a workpiece during use. The first lead 18 can also be in electrical communication with a power supply and a second lead 19 as shown. The power supply can be any suitable supply and can be internal or external to the FDS device. The second lead 19 can contact the second side of a stack-up (or of one or more individual pieces of a stack-up) so as to establish current flow across one or more pieces of the stack-up and resistively heat the stack-up.

To ensure electrical contact between the fixture 10 and a workpiece, the connectors 11 can be configured to be tightly held against the workpiece. For instance, a fixture 10 can also include a spring 14 (e.g., a coil spring, leaf spring, wave spring, etc.) that can optionally be protected by a housing 21, that can ensure contact is maintained when the downholder 17 engages a workpiece during the FDS process.

Following attachment of a fixture 10 to an existing FDS machine (or following formation of a machine to include an electrically isolated fixture), the leads 18, 19 can be connected to a work piece, for instance by the spindle heads, a clamping fixture (an example of which is described further in the examples below), or an off-spindle fixture, and energized by the power supply.

Of course, utilization of a fixture 10 as described is only one approach for electrical augmentation of an FDS joining method, and other approaches are encompassed herein. For example, in one embodiment, electricity can be applied to a workpiece directly through a fastener with a ground elsewhere on the workpiece. For instance, a first electrical lead can be connected to an electrically conductive driving element, which, in turn, engages an electrically conductive fastener, and a second electrical lead can be connected to the second side of the workpiece. Grounding can be via a downholder or other component of the device. Other variations as would be evident to one of ordinary skill in the art are likewise encompassed herein.

The current density applied across the work piece can vary depending upon the specific characteristics of a joining process. For instance, if the stack-up includes an adhesive between individual layers, the second lead may make contact within the stack-up, so as to provide the desired current density across a conductive path of the stack-up. In addition, the current density can be varied depending upon the specific materials to be used. For instance, a higher current density may be preferred for joining thicker or harder materials.

By way of example, during use a current density can be established across one or more layers of the workpiece of about 45 A/m$^2$ or greater, for instance from about 45 A/m$^2$ to about 90 A/m$^2$, or even higher in some embodiments. The electrical augmentation during use can soften the workpiece in the area that the fastener will pass through and provide for faster joining at lower installation torque, among other benefits. Moreover, disclosed methods can be carried out on existing machines, with the only addition to the existing machines being the addition of a power supply and machine modifications as described, which could be provided at a fraction of the cost of a new machine.

Electrical augmentation can allow for adaptation of existing machines to push beyond the limits that were originally imposed upon them and can decrease joining costs. For instance, disclosed EAFDS methods can enable the use of smaller, less expensive fasteners in applications that previously required larger fasteners in addition to joining thicker, harder materials, as discussed previously. Moreover, fixtures and methods as disclosed herein can provide for electrical augmentation of existing machines already present in active production lines at low costs without the need to change-out machines, for instance when new materials emerge (e.g., thicker and lighter materials) for use in new or existing products.

The present disclosure may be better understood with reference to the Examples set forth below.

Example 1

Figure 7:
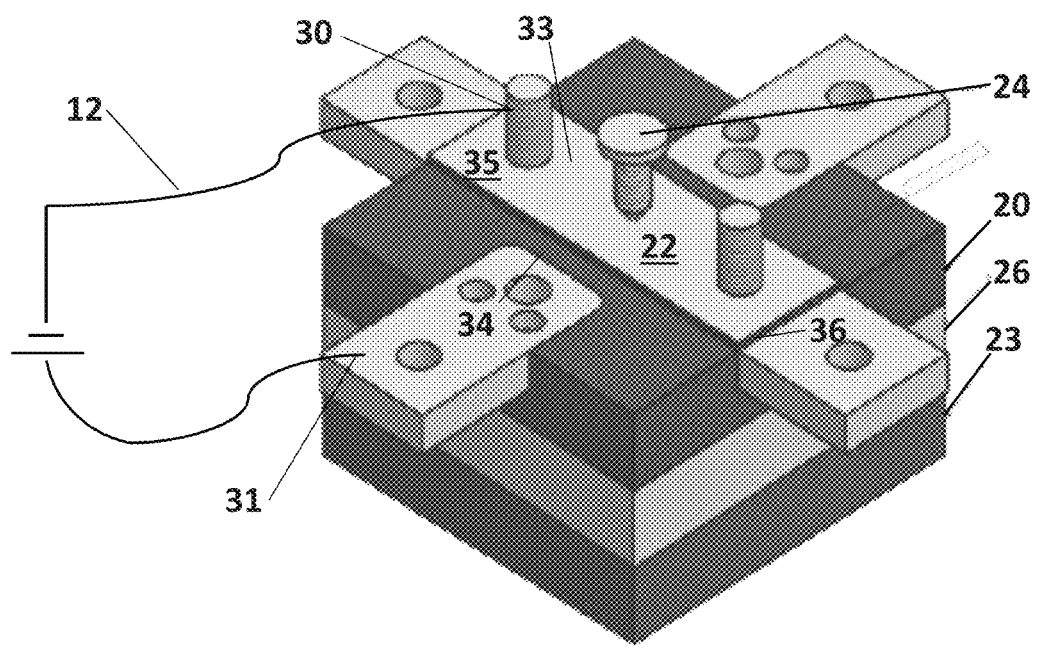
FIG. 7 illustrates a clamping fixture utilized in examples described herein.

Two 1.3 mm sheets 35, 36 of 6063-T5 aluminum, having properties as listed in Table 1, below, were held in a 2-layer stack-up in a clamping fixture as shown in FIG. 7. All FDS joints were created using a modified DEPRAG Flow Form Screwdriving (FFS) machine and an EJOT® FDS® M5 fastener composed of 1022 steel.

TABLE 1

| Property | Value | Units |
|---|---|---|
| Density | 2.7 | g/cm$^3$ |
| Ultimate Tensile Strength | 186 | MPa |
| Yield Strength | 145 | MPa |
| Electrical Resistivity | 3.16 × 10$^{-8}$ | ohm-m |
| Thermal Conductivity | 209 | W/m-K |

The FFS machine was modified to insulate the electronics from current being passed through the aluminum sheets 35, 36. A fixture 10 as illustrated in FIG. 4, FIG. 5, and FIG. 6 was manufactured to allow current to flow from one side of the stack-up to the other, which ensured current was passing through the joining zone. The clamping fixture (FIG. 7) was designed for thermal and electrical isolation by inclusion of a ceramic layer 20 for thermal isolation to protect the Delrin® plastic layer 26 and the Haysite composite layer 23 underneath. The electrical assembly 12 included copper welding leads 30, 31 that were place in electrical connection with the upper 33 and lower 34 sides of the workpiece 22 as shown. The dimension of the electrical contact was negligible as the electricity flowing through the cross-sectional area was of importance. The leads were spaced far enough apart in order that the electricity could fully engulf the cross-sectional area of the workpiece 22 as a fastener 24 was engaged with the workpiece 22. The difference between the electrical assisted process and a traditional process was that current was flowing through the workpiece 22. The actual joining process itself was not different from the FDS machine's standard process or from a process control standpoint.

Figure 8:
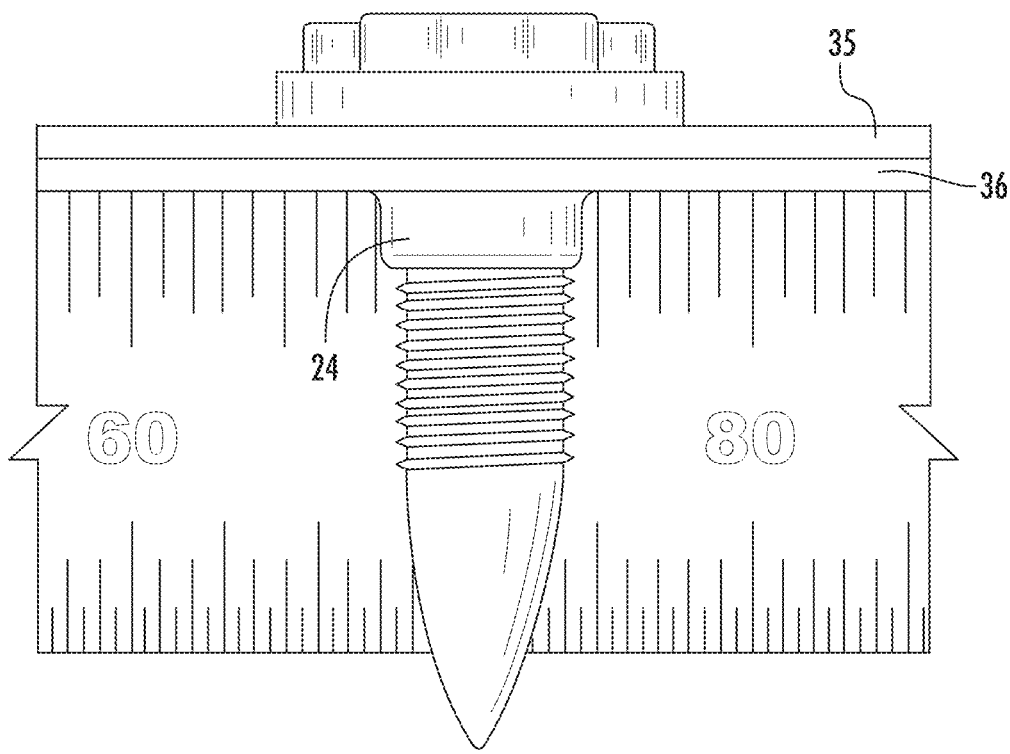
FIG. 8 illustrates an FDS joint formed according to disclosed techniques.

Three current densities, 0 A/mm$^2$ (no applied voltage), 45 A/mm$^2$, and 90 A/mm$^2$, were chosen to determine what effect electrical augmentation had on the joining of the aluminum stack-up during FDS, where current density was calculated to be the applied current divided by the cross-sectional area of the workpiece 22. 0 was chosen as a baseline comparison to an un-augmented process, 90 A/mm$^2$ was selected due to the 3000 Amp limitation of the power supply, and 45 A/mm$^2$ was chosen as a midpoint between the two. FIG. 8 illustrates a representative formed joint.

The parameters for the FDS process were kept constant regardless of current density to allow for joint metric comparison. A rotational speed (n) of 6000 rpm and an axial force ($F_{axial}$) of 600 N were implemented on the fastener 24 for the first five steps (heating, penetration, extrusion forming, thread forming, screw driving). 2.5 mm before the head contacted the top sheet, for step 6 (final torqueing) the speed was lowered to 250 rpm and the axial force to 500 N until a tightening torque ($T_t$) of 6 N-m was reached (Table 2—three trials for each condition). The average starting temperature was the temperature of the metal workpiece 22 heated by electricity before contact with the fastener 24.

TABLE 2

| Sample | Current Density (A/m$^2$) | Ave. Starting Temp (° C.) | $n_{1-5}$ (rpm) | $F_{axial\ 1-5}$ (N) | $n_6$ (rpm) | $F_{axial\ 6}$ (N) | $T_t$ (N-m) |
|---|---|---|---|---|---|---|---|
| Baseline 1 | 0 | 28 | 6000 | 600 | 250 | 500 | 6 |
| Baseline 2 | | | | | | | |
| Baseline 3 | | | | | | | |

TABLE 2-continued

| Sample | Current Density (A/m$^2$) | Ave. Starting Temp (° C.) | $n_{1-5}$ (rpm) | $F_{axial\ 1-5}$ (N) | $n_6$ (rpm) | $F_{axial\ 6}$ (N) | $T_t$ (N-m) |
|---|---|---|---|---|---|---|---|
| CD45T1 | 45 | 51 | | | | | |
| CD45T2 | | | | | | | |
| CD45T3 | | | | | | | |
| CD90T1 | 90 | 128 | | | | | |
| CD90T2 | | | | | | | |
| CD90T3 | | | | | | | |

Figure 9:
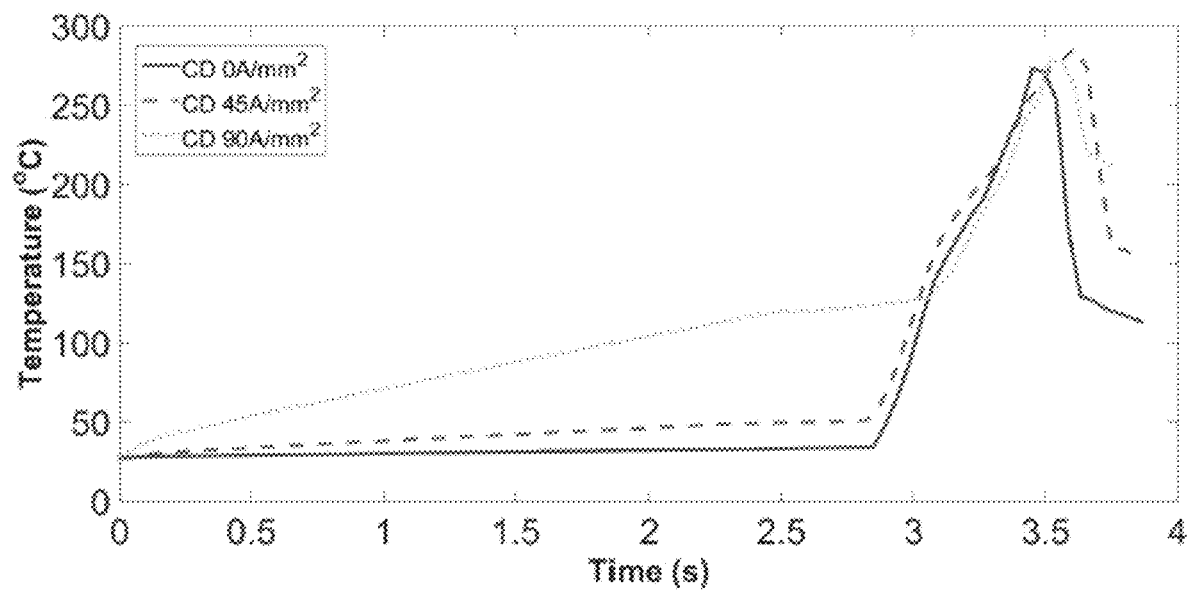
FIG. 9 graphically compares the change in temperature over the course of FDS fastening processes for non-assisted and electrically assisted FDS processes.
Figure 10:
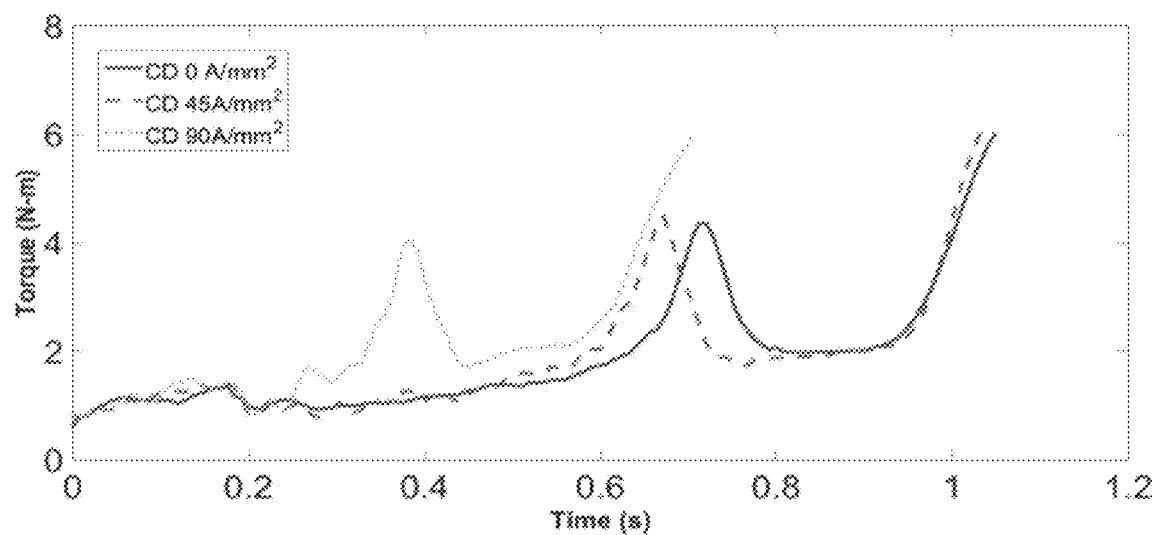
FIG. 10 graphically compares the change in torque over the course of FDS fastening processes for non-assisted and electrically assisted FDS processes.

Installation torque is the amount required to thread-form the stack-up during the FDS process. It is the value that sets the stack-up thickness limit to the imposed upper limit of 8.3 N-m (a standardized value for M5 self-tapping screws). The ability to lower the installation torque not only pushes the boundary for what the current thickness limitation is, approximately 6 mm, but also increases the factor of safety towards potential screw failure during installation. It has previously been shown that pre-heating a material to 143° C. with a conduction ring decreased installation torque by 14%. However, with electricity being the source of temperature increase, an installation torque decrease of 18% was achieved with only a pre-process temperature of 128° C. of the 90 A/mm$^2$ current density (FIG. 9). While the baseline installation torque value of 5.12 N-m (FIG. 10) was far below the 8.3 N-m limit, the results from this study show that the approximate 6 mm stack-up thickness limit can be overcome with the assistance of electrical augmentation.

Process time begins when the fastener touches down on the top sheet material and ends when the head is seated on the top surface and the desired final torque value is reached. The process time comparison does not include the 'finding of the screw' due to the variation in equipment manufacturers. No reduction in process time was observed for the 45 A/mm$^2$ current density due to the low pre-process temperature of 51° C. However, as the 90 A/mm$^2$ sample had a pre-process temperature of 128° C., a 32% reduction in process time was achieved. As the material was thermally-softened prior to the fastener-workpiece frictional process, the fastener could penetrate the stack-up quicker and achieve a shorter process time Temperature measurements were taken using a FLIR A40 infrared camera to observe the rise in temperature from the electrical augmentation (FIG. 9). The samples were spray painted black to ensure accurate measurements from the thermal camera and a thermocouple was used to verify the temperature values.

As seen in FIG. 9, three distinct slopes (prior to heat generation through fastener friction) were observed for the three different current densities. As expected, the 90 A/mm$^2$ sample had the largest slope and was able to obtain the highest pre-process temperature of 128° C. Despite the three current densities having different starting temperatures of 28° C., 51° C., and 128° C., they all reached approximately the same maximum temperature of 280° C. This occurred because although the electricity was adding heat to the process, it was also thermally softening the material quicker and thus the fastener could penetrate the stack-up quicker and required less frictional energy from the fastener to increase the material temperature.

One FDS joint strength metric used to quantify the quality of the joint is the break-loose torque. This torque value is the required torque to loosen the fastener (in the counter-clockwise direction) after a complete installation has occurred. Manufacturers perform this study to ensure little to no clamp load is lost as the joint returns to ambient temperature. During this study, a final torque of 6 N-m was imposed on all the joints and was used as a reference to the required torque to loosen the fastener. Three replications for each current density were tested and an average break-loose torque for the 0 A/mm$^2$, 45 A/mm$^2$, and 90 A/mm$^2$ samples were 5.58 N-m, 5.60 N-m, and 5.62 N-m, respectively. It was concluded that the electrical augmentation had no detrimental effect on the joint metric of break-loose torque.

Example 2

A non-assisted FDS process was compared to an electrically assisted FDS process using a fixture as illustrated in FIG. 4, FIG. 5, and FIG. 6 to join a piece of 6063-T5 aluminum (1.3 mm) and Usibor 1500 boron steel (1.5 mm).

Figure 11:
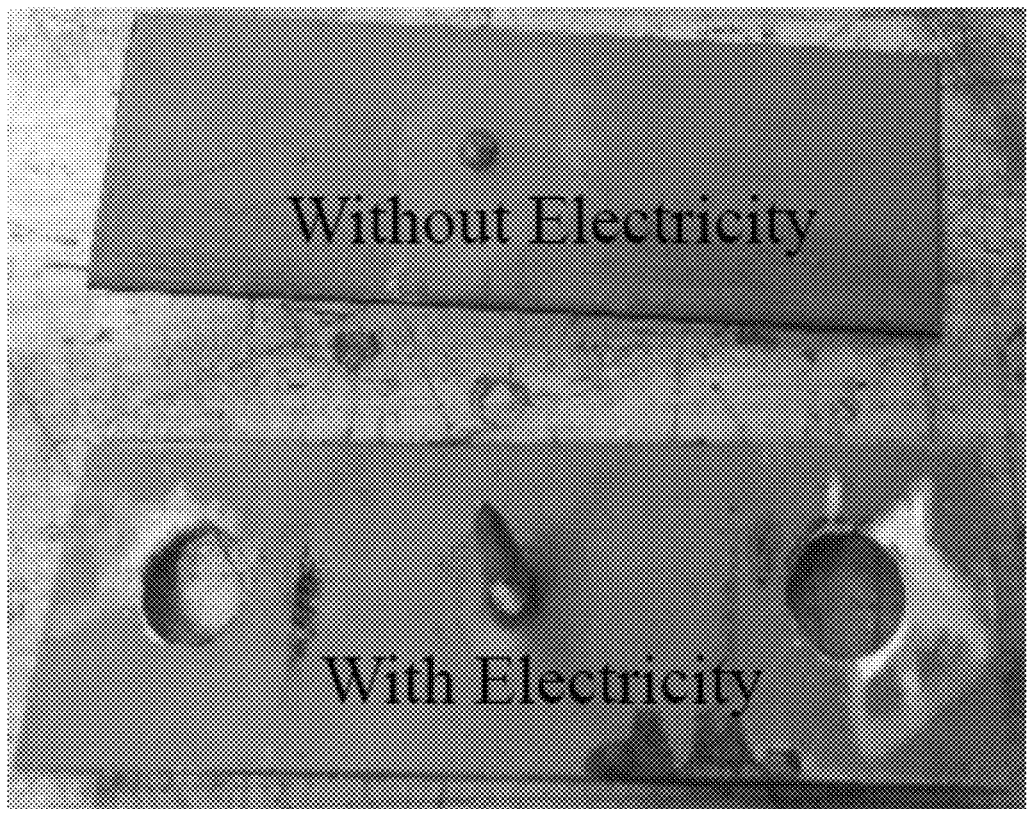
FIG. 11 illustrates a boron steel piece following an attempted traditional FDS process to join the boron steel to an aluminum piece (top) and a boron steel piece following an electrical assisted FDS process as described to join the boron steel to an aluminum piece (bottom).

The electrically assisted FDS process utilized a current density of 60 A/m$^2$; 3600 amps. Without the electricity the fastener would not penetrate through the boron steel (FIG. 11, top). With the electricity flow, there was successful penetration of the fastener into the stack-up (FIG. 11, bottom). The total process time lasted only 4 seconds and was able to soften the boron steel enough for a fastener to puncture through without damaging the fastener. By placing the steel piece on the top of the stack (i.e., in initial contact with the fastener tip), easier, quicker heating may be provided with little or no damage to the aluminum.

While certain embodiments of the disclosed subject matter have been described using specific terms, such description is for illustrative purposes only, and it is to be understood that changes and variations may be made without departing from the spirit or scope of the subject matter.

What is claimed is:

1. A method for joining a first metal piece to a second metal piece, comprising:
    placing a first side of a workpiece in electrical communication with a first electrical lead, the workpiece comprising the first and second metal pieces;
    placing a second, opposite side of the workpiece in electrical communication with a second electrical lead;
    establishing an electrical current density between the first electrical lead and the second electrical lead and across the workpiece from the first side to the second, opposite side;
    contacting the first side of the workpiece with a flow drill screwdriving fastener; and
    rotating the flow drill screwdriving fastener while imparting an axial force on the flow drill screwdriving fastener as the electrical current density is maintained across the workpiece by which a portion of the fastener passes through the workpiece and the first and second metal pieces are joined to one another.

2. The method of claim 1, wherein the workpiece is indirectly connected to the first and second electrical leads.

3. The method of claim 1, wherein the workpiece is stabilized by a downholder.

4. The method of claim 3, wherein the downholder is electrically non-conductive at a contact between the workpiece and the downholder.

5. The method of claim 1, wherein the flow drill screwdriving fastener is engaged with a driving element.

6. The method of claim 5, wherein the driving element is electrically non-conductive at a contact between the flow drill screwdriving fastener and the driving element.

7. The method of claim 1, wherein the current density is about 45 A/m$^2$ or greater.

8. The method of claim 1, wherein the current density is from about 45 A/m$^2$ to about 90 A/m$^2$.

9. The method of claim 1, wherein the workpiece measures about 7 millimeters or greater from the first side to the second opposite side.

10. The method of claim 1, wherein one or both of the first metal piece and the second metal piece is a steel piece.

11. The method of claim 10, wherein the steal has a tensile strength of about 1000 MPa or greater.

12. The method of claim 1, wherein one or both of the first metal piece and the second metal piece comprises boron steel.

* * * * *